United States Patent
Jupe

(10) Patent No.: US 10,473,160 B2
(45) Date of Patent: Nov. 12, 2019

(54) SLIDING BEARING WITH LINING LAYER COMPRISING CARBON NANOSTRUCTURES

(71) Applicants: Mahle International GmbH, Stuttgart (DE); Mahle Engine Systems UK Ltd, Warwickshire (GB)

(72) Inventor: Kevin Jupe, Rugby Warwickshire (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 696 days.

(21) Appl. No.: 14/655,026

(22) PCT Filed: Dec. 10, 2013

(86) PCT No.: PCT/GB2013/053253
§ 371 (c)(1),
(2) Date: Jun. 23, 2015

(87) PCT Pub. No.: WO2014/102529
PCT Pub. Date: Jul. 3, 2014

(65) Prior Publication Data
US 2015/0369286 A1 Dec. 24, 2015

(30) Foreign Application Priority Data
Dec. 24, 2012 (GB) .................................. 1223351.6

(51) Int. Cl.
*B32B 9/00* (2006.01)
*F16C 33/12* (2006.01)
(Continued)

(52) U.S. Cl.
CPC .............. *F16C 33/125* (2013.01); *B22F 7/04* (2013.01); *B82Y 30/00* (2013.01); *C22C 1/0425* (2013.01);
(Continued)

(58) Field of Classification Search
CPC .......... C01B 31/022–31/0293; C01B 2202/00; B82Y 30/00; Y10T 428/30
(Continued)

(56) References Cited

U.S. PATENT DOCUMENTS 7,479,516 B2 * 1/2009 Chen ...................... B82Y 30/00
423/445 B
2002/0060514 A1 5/2002 Nakamoto
(Continued)

FOREIGN PATENT DOCUMENTS

CN 101219476 A 7/2008
CN 101788015 A 7/2010
(Continued)

OTHER PUBLICATIONS

English abstract for JP2008144253.
(Continued)

*Primary Examiner* — Daniel H Miller
(74) *Attorney, Agent, or Firm* — Fishman Stewart PLLC

(57) ABSTRACT

A sliding bearing may include a backing layer and a sintered lining layer. The lining layer may include a composition of 0.1 to 10 percent by weight carbon nanostructures embedded in a copper-based matrix. The sliding bearing may include, but is not limited to, at least one of a bearing bush, a bearing shell, and a thrust washer.

20 Claims, 2 Drawing Sheets

(51) Int. Cl.
  *B82Y 30/00* (2011.01)
  *F16C 33/14* (2006.01)
  *B22F 7/04* (2006.01)
  *C22C 1/04* (2006.01)
  *C22C 26/00* (2006.01)
  *B22F 1/02* (2006.01)

(52) U.S. Cl.
  CPC ............ *C22C 26/00* (2013.01); *F16C 33/121* (2013.01); *F16C 33/124* (2013.01); *F16C 33/128* (2013.01); *F16C 33/14* (2013.01); *F16C 33/145* (2013.01); *B22F 1/025* (2013.01); *C22C 2026/002* (2013.01); *Y10T 428/30* (2015.01)

(58) Field of Classification Search
  USPC .......................................... 428/408; 252/501
  See application file for complete search history.

(56) References Cited

U.S. PATENT DOCUMENTS

| | | |
|---|---|---|
| 2005/0052088 A1 | 3/2005 | Kakegawa et al. |
| 2007/0141315 A1* | 6/2007 | Sato ....................... B82Y 10/00 428/292.1 |
| 2007/0243406 A1* | 10/2007 | Trybus .................... B32B 15/01 428/648 |
| 2009/0317657 A1* | 12/2009 | Knoblauch ........... B32B 15/013 428/647 |
| 2010/0015002 A1* | 1/2010 | Barrera .................. B82Y 30/00 419/11 |

FOREIGN PATENT DOCUMENTS

| | | |
|---|---|---|
| DE | 102005023843 A1 | 11/2006 |
| DE | 102008056750 A1 | 5/2010 |
| GB | 2386610 A | 9/2003 |
| JP | 2001123253 | 5/2001 |
| JP | 2008144253 A | 6/2008 |
| WO | WO-2007118048 A2 | 10/2007 |
| WO | WO-2010054619 A2 | 5/2010 |

OTHER PUBLICATIONS

English abstract for JP2001123253.
English abstract for CN101219476.
English abstract for DE102005023843.
English abstract for DE102008056750.
GB search report for GB1223351.6, dated Apr. 26, 2013.
English abstract for CN-101788015.
EP Office Action for EP-13805497.8, dated Apr. 29, 2016.

* cited by examiner

SLIDING BEARING WITH LINING LAYER COMPRISING CARBON NANOSTRUCTURES

CROSS-REFERENCE TO RELATED APPLICATIONS

This application claims priority to British Patent Application No. 1223351.6, filed Dec. 24, 2012, and International Patent Application No. PCT/GB2013/053253, filed Dec. 10, 2013, both of which are hereby incorporated by reference in their entirety.

TECHNICAL FIELD

The present invention relates to sliding bearings having a sintered metallic sliding layer and a metal backing layer, and more particularly, but not exclusively, to sliding bearings for connecting rod small end bearings, and thrust washers for bearing shells in crankshaft main bearings.

BACKGROUND

Bearing bushes are used at the small end of the connecting rod, to connect onto the piston pin (also known as a gudgeon pin or wrist pin), and may be used elsewhere in an engine. Bearing bushes are hollow cylindrical bearing liners, that may be solid sleeve bushes, split bushes (in which a strip is formed into a cylinder with butt-jointed ends) or clinch bushes (like split bushes, additionally provided with mutual engagement features on the ends of the strip).

Known bearing bushes comprise a strong steel backing layer and a metal lining layer on the backing layer, which provides the running surface for the journal (e.g. gudgeon pin/wrist pin) rotatably held in the bearing.

Main crankshaft bearings typically comprise pairs of hollow semi-cylindrical bearing shells that may be provided with a thrust washer that is generally semi-annular, annular or circular.

It is desirable to provide increased wear resistance and to improve the fatigue strength of bearing lining layers in such bearings.

SUMMARY

According to a first aspect of the invention, there is provided a sliding bearing comprising
 a backing layer, and
 a sintered lining layer,
wherein the lining layer comprises 0.1-10% wt carbon nanostructures embedded in a copper-based matrix.

According to a second aspect, there is provided an engine comprising a sliding bearing according to the first aspect of the invention.

According to a third aspect of the invention, there is provided a method of manufacturing a blank for a sliding bearing comprising
 a backing layer, and
 a sintered lining layer,
wherein the lining layer comprises 0.1-10% wt carbon nanostructures embedded in a copper-based matrix, the method comprising
 blending the carbon nanostructures with powdered constituents of the matrix to form a mixture;
 distributing the mixture onto a sheet of the backing layer;
 sintering the mixture to form the lining layer on the backing layer; and
 forming a blank from the sheet.

According to a fourth aspect of the invention, there is provided a method of manufacturing a sliding bearing comprising:
 manufacturing the blank for a sliding bearing according to the third aspect of the invention; and
 shaping the blank to form the sliding bearing.

Advantageously, the addition of the carbon nanostructures may increase the wear resistance, increase the tensile and yield strength, and increase the elastic modulus. Advantageously, the carbon nanostructures may provide self-lubrication properties, which reduce the friction coefficient and wear rate of the bearing, and may reduce the operating temperature of the bearing. Further, the carbon nanostructures may reduce the propagation of cracks in the lining layer. Yet further, the carbon nanostructures may stabilise grains in the granular structure of the lining layer when the grain boundaries become weakened at high operating temperatures, reducing their relative movement and reducing material wear of the lining layer.

By copper-based matrix is meant pure copper (apart from incidental impurities) or a copper-based alloy comprising at least ≥50% wt of copper.

The backing layer may be a steel backing layer.

The lining layer may comprise 0.5-4.0% wt carbon nanostructures. Advantageously, below the 4.0% wt, the carbon nanostructures may be more uniformly dispersed, with lower levels of agglomeration, resulting in improved strength, wear resistance and fatigue resistance, and may reduce blending time.

The lining layer may comprise 4-10% wt tin.

The lining layer may comprise nickel in a proportion of up to 1.5% wt. Advantageously, the nickel may provide increased corrosion resistance.

The carbon nanostructures may be at least partially metal-coated carbon nanostructures. Advantageously, the (full or partial) metallic coating may enhance the blending of the carbon nanostructures with the other powdered ingredients to form the mixture for sintering, and may increase the bonding strength between the carbon nanostructures and the copper-based matrix.

The metal coated carbon nanostructures may be coated with a metal present in the matrix of the lining layer. The coating metal may be selected from the group consisting of tin, copper and nickel.

Carbon nanostructures describes members selected from the group consisting of carbon nanotubes, carbon nano-spheres, carbon nano-ellipsoids, functionalised carbon nanotubes, functionalised carbon nano-spheres and functionalised carbon nano-ellipsoids (i.e. carbon nanotubes and like structures).

The carbon nanostructures may comprise carbon nanotubes. The nanotubes may be 0.5 to 50 nm in diameter. The nanotubes may be 1 to 40 μm long. The nanotubes may comprise between 0.1 and 10% vol of the composite layer. The nanotubes may be at least 100 times longer than their diameter, and optionally at least 1000 times longer than their diameter.

In the case of carbon nanotubes, they may particularly enhance thermal dissipation through the lining layer, e.g. away from the free surface of the lining layer.

The carbon nanostructures may comprise ball-shaped carbon nanostructures.

The carbon nanostructures may comprise ellipsoidal carbon nanostructures.

The carbon nanostructures may be functionalised carbon nanostructures.

The sliding bearing may be selected from the group consisting of a bearing bush, a bearing shell, and a thrust washer.

BRIEF DESCRIPTION OF THE DRAWINGS

Embodiments of the invention are further described hereinafter with reference to the accompanying drawings, in which.

DETAILED DESCRIPTION

Figure 1:
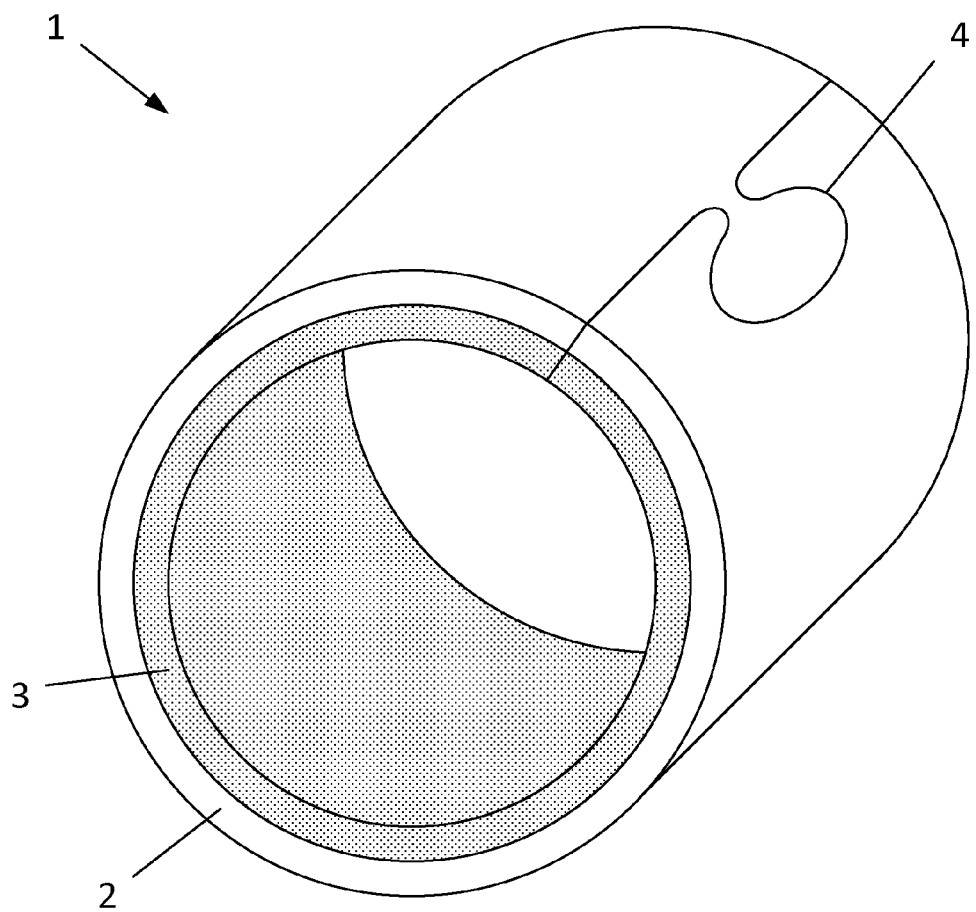
FIG. 1 shows a schematic illustration of a bearing bush.

FIG. 1 illustrates a hollow, generally cylindrical clinched bush (bushing) 1 type of sliding bearing. The bush 1 is bi-metallic, having a different metallic backing layer 2 and metallic lining layer 3.

The bush 1 is formed from a flat strip-shaped blank, that has been formed into the cylindrical shape, with opposite ends of the blank engaged by means of a clinch 4 (a tongue with a narrow neck that is received into a corresponding cut-out with a narrow throat). In this case, the closed shape of the bush 1 is maintained by the clinch 4 (which is an optional feature absent from split bushes and solid sleeve bushes).

Figure 2:
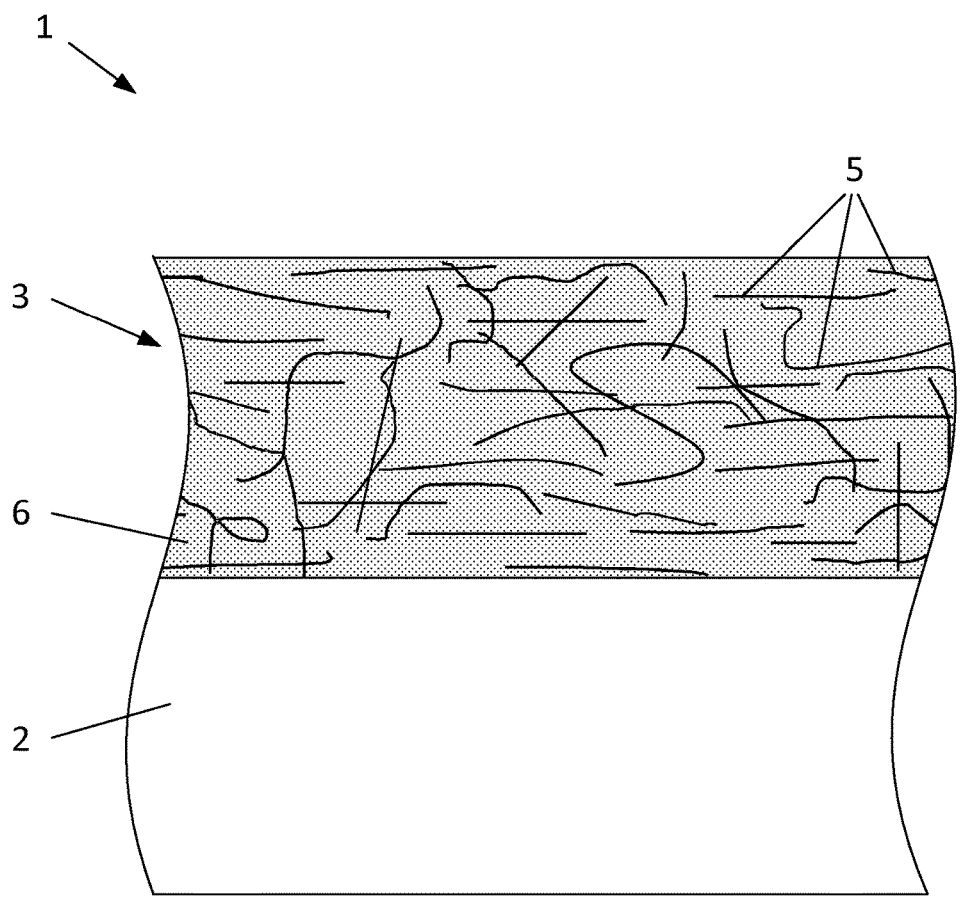
FIG. 2 shows a schematic cross-sectional view through part of the bearing bush of FIG. 1.

FIG. 2 shows a cross-sectional view through a flat strip before it is formed into the cylindrical shape of the bush in FIG. 1. The backing layer 2 is steel, and the lining layer 3 is a copper-based composite lining layer 3, comprising carbon nanotubes 5 in a copper-based alloy matrix 6.

The composition of the lining layer 3 is:

0.5-4.0% wt carbon nanostructures (e.g. carbon nanotubes);

4-10% wt tin;

0-1.5% wt nickel; and balance to 100% wt of copper, apart from incidental impurities.

The blank is cut from a sheet of backing material having a sintered lining layer, and formed by a sintering process, as follows: the carbon nanostructures are blended together with the other ingredients in powdered form; the composite powder is distributed onto a sheet of backing layer material; the structure is sintered at high temperature in an inert or other non-oxidising environment; the structure is rolled before being sintered a second time; and the blanks are stamped out from the sintered structure.

Although only a bearing bush is illustrated, the present invention is also applicable to sintered lining layers on other sliding bearings, including thrust washers (in which the lining layer is provided on an axial face of a generally semi-annular backing layer, facing the counterface of a crankshaft web).

A carbon nanostructure is any carbon allotrope composed entirely of carbon, in the form of a hollow sphere, ellipsoid, or tube having a sub-micron diameter. The incorporation of carbon nanostructures into the metallic matrix increases the strength, hardness and wear resistance of the composite lining layer, whilst still permitting good conformability of the bearing. The exposed carbon nanostructures also increase the lubricious properties of the free surface, reducing friction of the metallic matrix when the shaft contacts the bearing lining layer, for example when the engine starts and before adequate lubrication oil has been provided to the bearing (e.g. by splash lubrication). Additionally, carbon nanostructures may be more flexible and have higher tensile strength than the micro-particulates that it is currently known to incorporate into a metal matrix to form a composite layer.

The carbon nanostructures also reinforce the metallic matrix. Additionally, in the case of carbon nanotubes, they may enhance thermal dissipation through the layer, e.g. away from the free surface of the lining layer.

The carbon nanostructures may be at least partially metal-coated, to enhance their bonding with the copper-based matrix and may enhance their blending with the other powdered ingredients to form the mixture for sintering. In particular, coating with a material present in the matrix reduces the risk of formation of undesirable intermetallics that comprise other materials. The metallic coating is applied to the carbon nanostructures by a process that may be an electroless chemical treatment, physical vapour deposition or thermal decomposition methods.

Alternatively, or additionally, the carbon nanostructure may be a functionalised carbon nanostructure, such as a functionalised single wall nanotube (SWNT) or multi-wall nanotube (MWNT).

Further alternatively, an aggressive mechanical milling process may be used, in which the carbon nanostructures and the metal powder are milled together with a media that results in the metal powders being broken apart and the carbon nanostructures becoming incorporated into the metal particles. These metal-carbon nanostructure granules are then blended with the rest of the powder matrix material and disperse much more easily than the carbon nanostructures alone.

Although the illustrated embodiment concerns a composite layer in which carbon nanotubes are incorporated into a metallic matrix, other types of carbon nanostructures may alternatively or additionally be incorporated, such as hollow spheres (e.g. $C_{52}$, $C_{60}$, $C_{70}$, $C_{76}$, $C_{84}$, etc.) or ellipsoids.

The sliding bearing may be a bearing shell or a thrust washer, which is inserted into the bearing assembly of an engine, such as an automotive engine.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding bearing comprising:
   a backing layer; and
   a sintered copper-based composite lining layer that defines an outermost layer with a running surface relative to the backing layer, the lining layer composed of a material including carbon nanostructures embedded in a copper-based matrix, wherein the material of the lining layer has a composition including:
   0.1 to 10% wt of carbon nanostructures;
   4 to 10% wt of tin;
   up to 1.5% wt of nickel; and
   a balance to 100% wt of copper and incidental impurities.

2. A sliding bearing according to claim 1, wherein the carbon nanostructures of the lining layer are included in a proportion of 0.5-4.0% wt.

3. A sliding bearing according to claim 1, wherein nickel is present in the composition of the lining layer to facilitate increased corrosion resistance.

4. A sliding bearing according to claim 1, wherein at least some of the carbon nanostructures are at least partially metal-coated carbon nanostructures having a separate metallic coating disposed thereon, and wherein the separate metallic coating includes a material present in the copper-based matrix.

5. A sliding bearing according to claim 4, wherein the material of the separate metallic coating is composed of at least one of tin, nickel, and copper.

6. A sliding bearing according to claim 1, wherein the carbon nanostructures include carbon nanotubes.

7. A sliding bearing according to claim 6, wherein the nanotubes are 0.5 to 50 nm in diameter.

8. A sliding bearing according to claim 6, wherein the nanotubes are 1 to 40 μm long.

9. A sliding bearing according to claim 6, wherein the nanotubes include between 0.1 and 10% vol of the composition of the lining layer.

10. A sliding bearing according to claim 6, wherein the nanotubes are at least 100 times longer than their diameter.

11. A sliding bearing according to claim 1, wherein the carbon nanostructures include ball-shaped carbon nanostructures.

12. A sliding bearing according to claim 1, wherein the carbon nanostructures include ellipsoidal carbon nanostructures.

13. A sliding bearing according to claim 1, wherein the carbon nanostructures are functionalised carbon nanostructures.

14. A sliding bearing according to claim 1, wherein the backing layer includes at least one of a bearing bush, a bearing shell, and a thrust washer.

15. An engine comprising: a sliding bearing, the sliding bearing including:
   a backing layer; and
   a sintered lining layer disposed on the backing layer that defines an outermost layer of the sliding bearing with respect to the backing layer and has a free surface facing away from the backing layer, the lining layer including carbon nanostructures embedded in a copper-based matrix, wherein the lining layer includes a composition, by weight, in the following proportions:
   0.1-10% of carbon nanostructures;
   4-10% of tin;
   0-1.5% of nickel; and
   a balance to 100% of copper and incidental impurities.

16. An engine according to claim 15, wherein at least some of the carbon nanostructures are metal-coated carbon nanostructures having a separate metallic coating disposed at least partially thereon to facilitate bonding of the metal-coated carbon nanostructures with the copper-based matrix, and wherein the separate metallic coating is composed of a material present in the copper-based matrix including at least one of tin, copper and nickel.

17. An engine according to claim 15, wherein the proportion of carbon nanostructures is 0.5-4.0% wt, and wherein nickel is present in the composition of the lining layer to facilitate increased corrosion resistance.

18. A sliding bearing, comprising:
   a backing layer; and
   a sintered copper-based composite lining layer that provides an outermost layer with a running surface relative to the backing layer, the running surface defined by a free surface of the lining layer that faces away from the backing layer;
   the lining layer having carbon nanostructures embedded in a copper-based matrix, wherein the lining layer has a composition consisting of:
   0.1 to 10% wt of carbon nanostructures;
   4 to 10% wt of tin;
   up to 1.5% wt of nickel; and
   a balance to 100% wt of copper and incidental impurities.

19. A sliding bearing according to claim 1, wherein at least some of the carbon nanostructures have a partial metallic coating disposed thereon composed of at least one of tin, copper and nickel.

20. A sliding bearing according to claim 1, wherein the running surface is defined by a free surface of the lining layer that faces away from the backing layer.

* * * * *